United States Patent
Kuo

(10) Patent No.: US 9,421,904 B2
(45) Date of Patent: Aug. 23, 2016

(54) VEHICLE FOG LAMP SET

(71) Applicant: Chun-Hsien Kuo, Miaoli County (TW)

(72) Inventor: Chun-Hsien Kuo, Miaoli County (TW)

(*) Notice: Subject to any disclaimer, the term of this patent is extended or adjusted under 35 U.S.C. 154(b) by 0 days.

(21) Appl. No.: 14/585,819

(22) Filed: Dec. 30, 2014

(65) Prior Publication Data

US 2016/0185278 A1    Jun. 30, 2016

(51) Int. Cl.
*B60Q 1/00* (2006.01)
*B60Q 1/115* (2006.01)
*B60Q 1/20* (2006.01)

(52) U.S. Cl.
CPC . *B60Q 1/115* (2013.01); *B60Q 1/20* (2013.01)

(58) Field of Classification Search
CPC ................................. B60Q 1/20; B60Q 1/115
See application file for complete search history.

(56) References Cited

U.S. PATENT DOCUMENTS

2008/0151565 A1* 6/2008 Leleve ............... B60Q 1/12
362/464

* cited by examiner

*Primary Examiner* — Thomas M Sember
(74) *Attorney, Agent, or Firm* — Muncy, Geissler, Olds & Lowe, P.C.

(57) ABSTRACT

A vehicle fog lamp set adopted for use on a vehicle includes a left fog lamp module, a right fog lamp module and a control drive module. The left fog lamp module includes a left fog lamp substrate, a left main fog lamp unit located in the center of the left fog lamp substrate and a left side fog lamp unit. The right fog lamp module includes a right fog lamp substrate, a right main fog lamp unit located in the center of the right fog lamp substrate and a right side fog lamp unit. The control drive module includes a central control unit and a turning detection unit to detect turning of the vehicle and activate the left side fog lamp unit and the right side fog lamp unit to reduce visual blind spots.

6 Claims, 4 Drawing Sheets

US 9,421,904 B2

VEHICLE FOG LAMP SET

FIELD OF THE INVENTION

The present invention relates to a vehicle lighting apparatus and particularly to a vehicle fog lamp set that can adjust light projection angle with turning of the vehicle.

BACKGROUND OF THE INVENTION

Invention of automobile had opened a new page in transportation history. The automobile not only greatly shortens time required on movement between two locations, also can shelter drivers from wind and rains, hence has become an indispensable transportation tool of people living in the modern time.

The automobile had first appeared in the middle of seventeenth century. Manufacturing technology of the automobile industry has advanced greatly ever since. The present automobile has greater performance and more comfort features that are unimaginable in the past. With enhanced performance on the automobile, if accidents take place during driving the seriousness also is greater. Hence vehicle safety is a significant issue which consumers care very much.

Vehicle safety features generally can be divided into passive type and active type. Vehicle design in the past mostly focused on the passive type safety features, such as safety belt, collision-resistant capability, airbag and the like. They are mainly designed to reduce injuries that might inflict passengers in the car when accidents occur, but cannot prevent traffic accidents from happening. Hence in the event that a serious traffic accident happens due to negligence of the vehicle driver the passive type safety features are not very effective, and people still could be hurt or lose life, and properties could be damaged or lost.

Thus, in recent years active type safety features get growing attention. Nowadays many types of active safety features and accessories, such as reverse radar, Collision Warning with Auto Brake (CWAB), Adaptive Cruise Control (ACC) and the like have been widely adopted in various types of vehicles.

To improve vehicle headlamp projection range deficiency that results in poor visual light during turning and might cause accidents, an Adaptive Front lighting System (AFS) has been developed that provides a turnable front lighting control system. It includes a turning detection unit and a central control unit. When a vehicle turns the turning detection unit notifies the central control unit to control the headlamp to turn in a direction corresponding to the vehicle turning direction so that the headlamp can project light in a direction coincided with the vehicle turning direction, thereby can reduce traffic accident probability caused by poor visual light.

However, due to the Adaptive Front lighting System matches turning of the headlamp with the vehicle driving direction, sideward light projection range is compromised. Moreover, the original projection range of the headlamp loses illumination abruptly due to turning the headlamp that generates blind spots in driver's visual sight. In the event that an obstacle happens intruding into the visual blind spots at that moment a serious traffic accident could occur.

SUMMARY OF THE INVENTION

The primary object of the present invention is to solve the problem of vehicles of generating blind spots due to lighting deficiency of the headlamps.

To achieve the foregoing object the present invention provides a vehicle fog lamp set adopted for use on a vehicle that includes a left fog lamp module, a right fog lamp module and a control drive module. The left fog lamp module is located on the left front side of the vehicle and includes a left fog lamp substrate, a left main fog lamp unit located in the center of the left fog lamp substrate and a left side fog lamp unit located on a left side edge of the left fog lamp substrate opposing the left main fog lamp unit. The right fog lamp module is located on the right front side of the vehicle and includes a right fog lamp substrate, a right main fog lamp unit located in the center of the right fog lamp substrate and a right side fog lamp unit located on a right side edge of the right fog lamp substrate opposing the right main fog lamp unit. The control drive unit includes a central control unit, a side fog lamp drive unit and a turning detection unit electrically connected to the central control unit to control the side fog lamp units. The side fog lamp drive unit is electrically connected to the central control unit, the left side fog lamp unit and the right side fog lamp unit.

After the turning detection unit has detected turning of the vehicle it issues a signal to the central control unit which analyzes and judges the signal, then activates the side fog lamp drive unit based on the turning direction of the vehicle to activate the left side fog lamp unit or the right side fog lamp unit corresponding to the turning direction of the vehicle.

Through the construction set forth above, the invention provides many advantageous features, notably:

1. Through the left side fog lamp unit and the right side fog lamp unit generation of visual blind spots during turning of the vehicle can be avoided to prevent accidents from taking place.

2. Through the turning detection unit vehicle turning direction can be detected and the left side fog lamp unit or the right side fog lamp unit can be automatically set on according to the turning of the vehicle.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
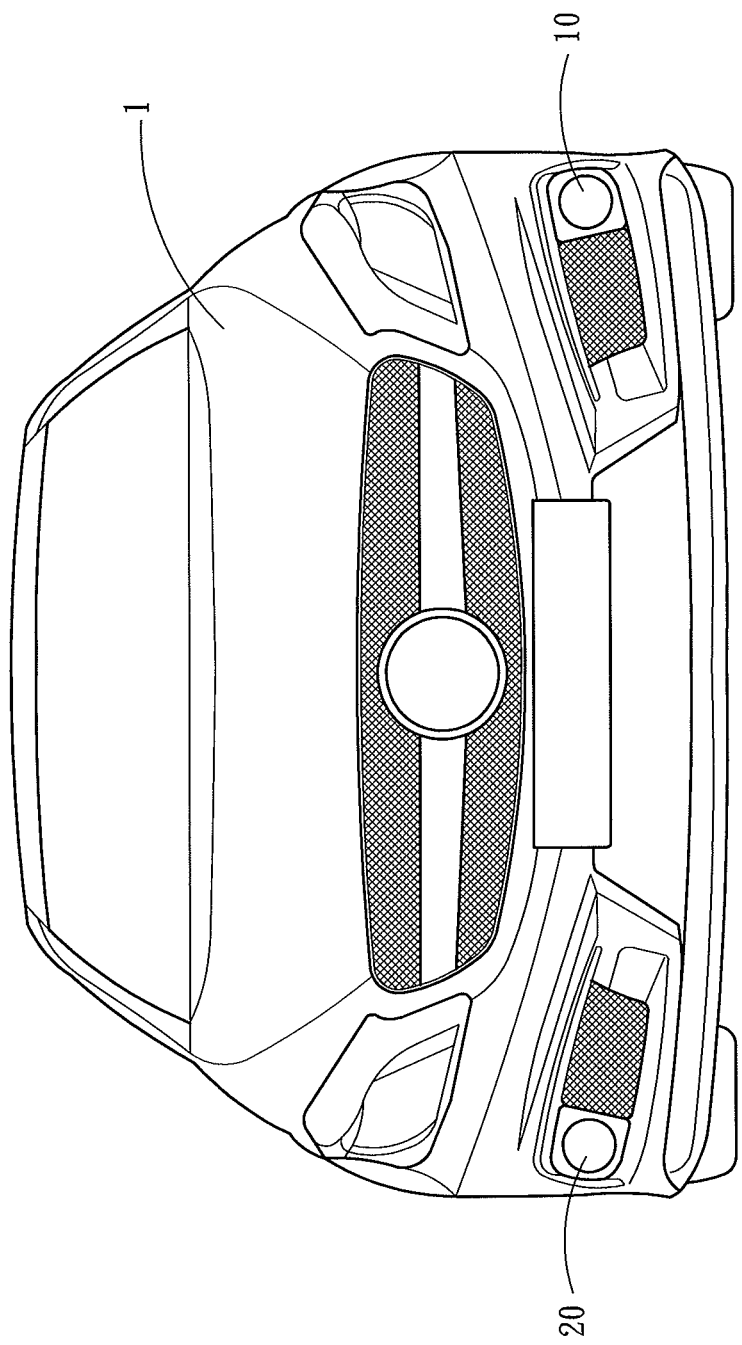
FIG. 1 is a schematic view of the vehicle fog lamp set of the invention showing installation locations.
Figure 2:
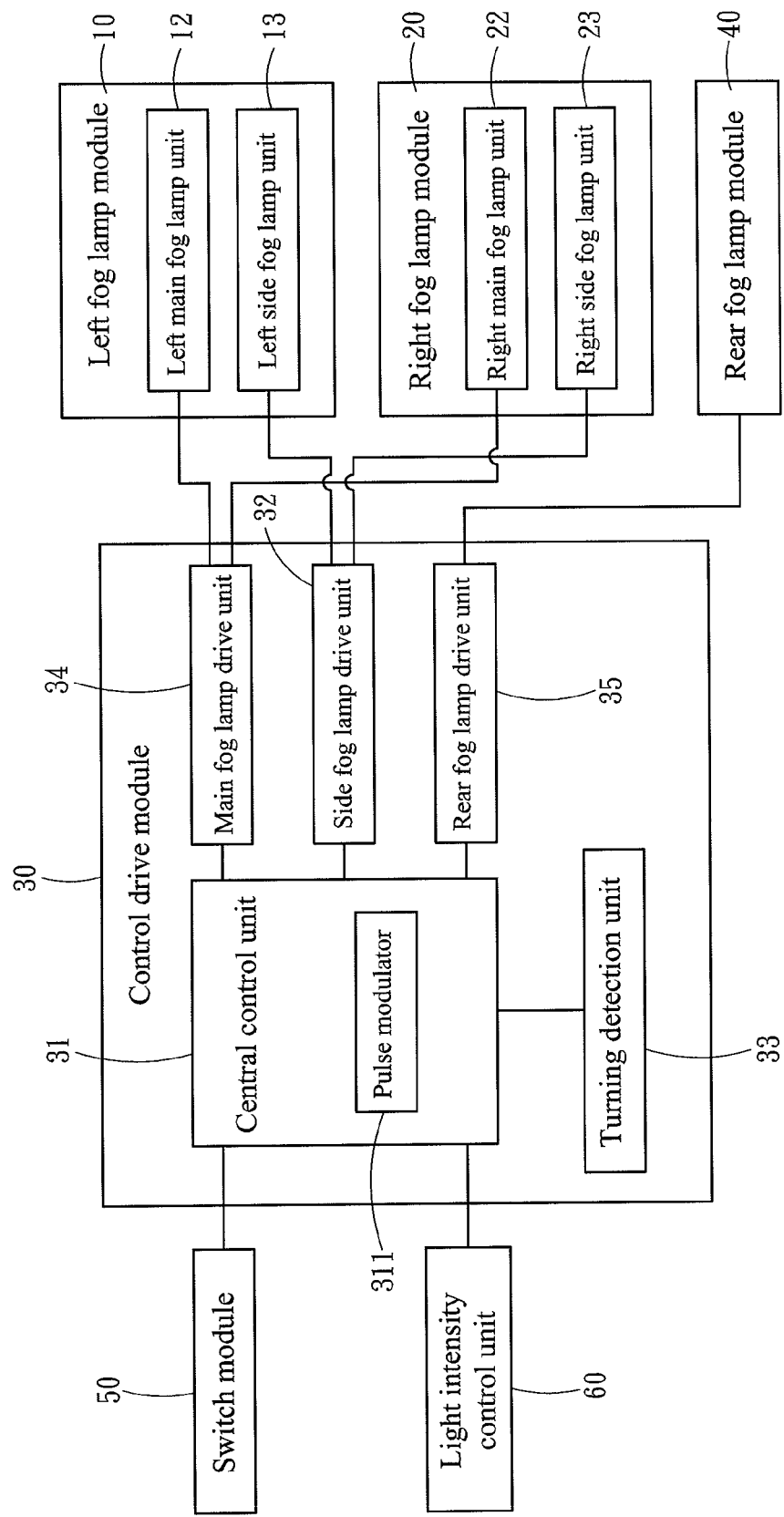
FIG. 2 is a unit configuration block diagram of the invention.
Figures 3, 4:
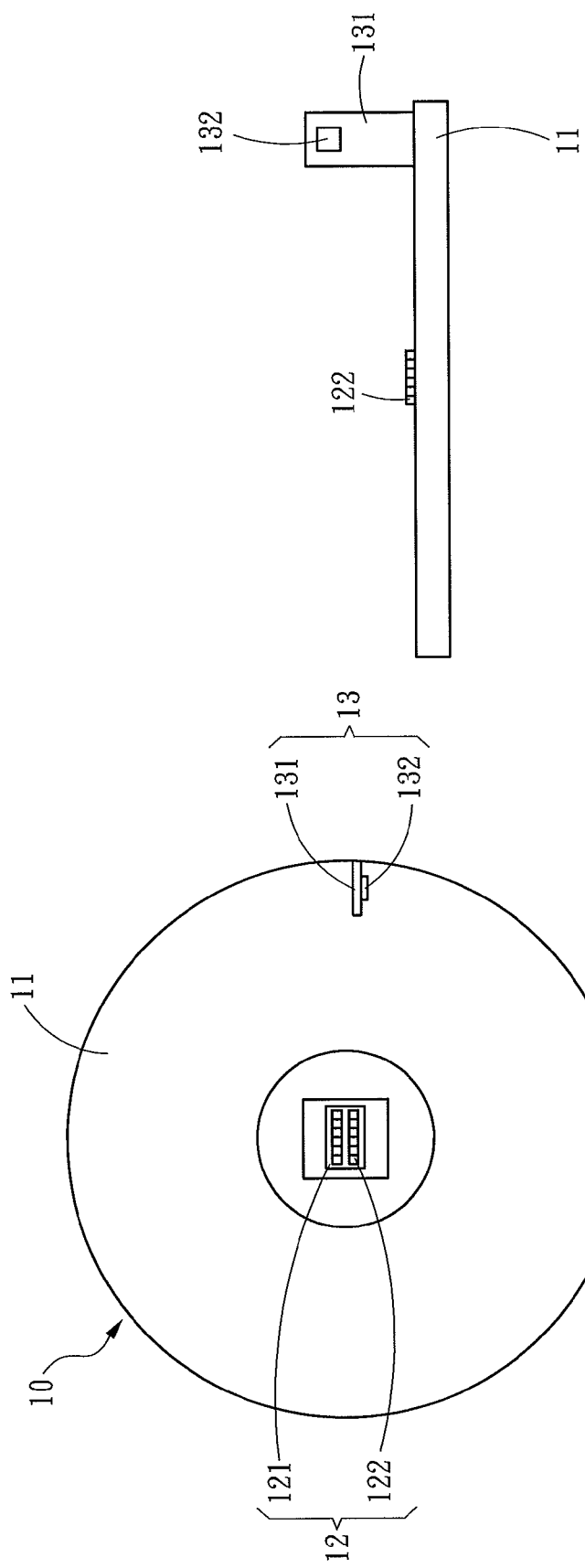
FIG. 3 is a plane view of a left fog lamp module.
FIG. 4 is a bottom view of the left fog lamp module.
Figure 6:
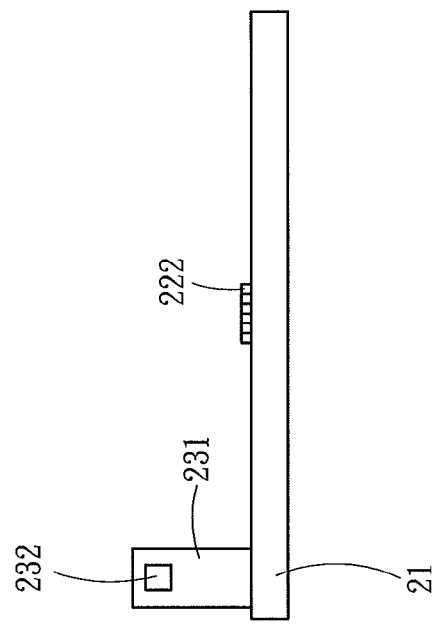
FIG. 6 is a bottom view of the right fog lamp module.
Figure 5:
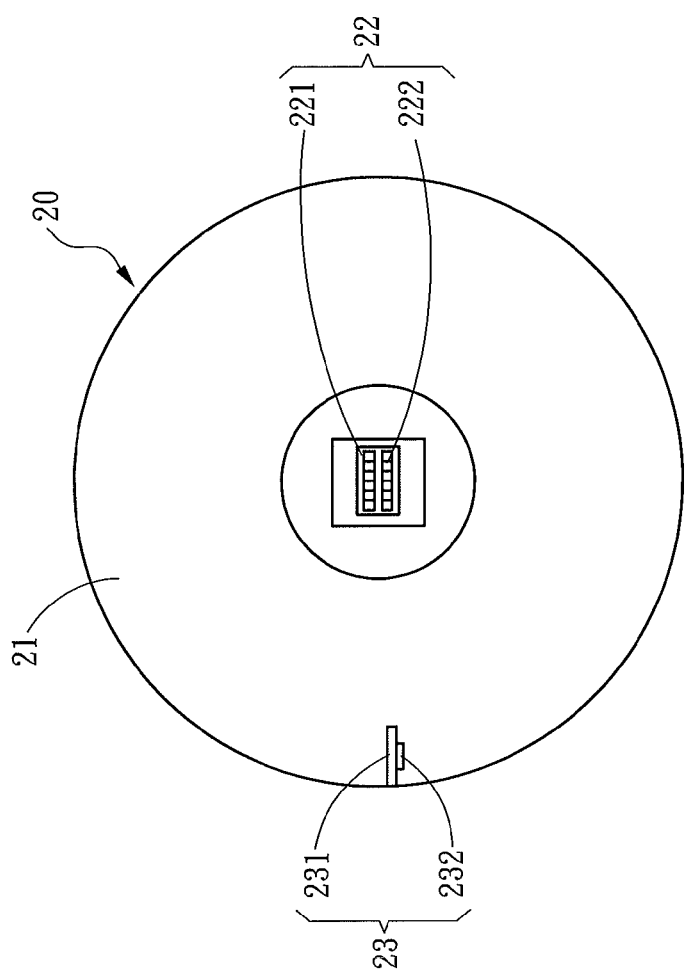
FIG. 5 is a plane view of a right fog lamp module.

Please referring to FIGS. 1 and 2, the present invention aims to provide a vehicle fog lamp set adopted for use on a vehicle 1. The vehicle fog lamp set includes a left fog lamp module 10, a right fog lamp module 20, a rear fog lamp module 40 located on the rear side of the vehicle 1 and a control drive module 30. The left fog lamp module 10 is located on the left front side of the vehicle 1 and includes a left fog lamp substrate 11 (as shown in FIG. 3), a left main fog lamp unit 12 located in the center of the left fog lamp substrate 11 and a left side fog lamp unit 13 located on a left side edge of the left fog lamp substrate 11 opposing the left main fog lamp unit 12. The right fog lamp module 20 is located on the right front side of the vehicle 1 and includes a right fog lamp substrate 21 (as shown in FIG. 5), a right main fog lamp unit 22 located in the center of the right fog lamp substrate 21 and a right side fog lamp unit 23 located on a right side edge of the right fog lamp substrate 21 opposing the right main fog lamp unit 22. The control drive module 30 includes a central control unit 31, a main fog lamp drive unit 34, a side fog lamp drive unit 32, a rear fog lamp drive unit 35, and a turning detection unit 33 electrically connected to the central control unit 31 to control the left side fog lamp unit 13 and the right side fog lamp unit 23. The main fog lamp drive unit 34 is electrically connected to the central control unit 31, the left main fog lamp unit 12 and the right main fog lamp unit 22. The side fog lamp drive unit 32 is electrically connected to the central control unit 31, the left side fog lamp unit 13 and the right side fog lamp unit 23. The rear fog lamp drive unit 3 is electrically connected to the central control unit 31 and the rear fog lamp module 40.

After the turning detection unit 33 has detected turning of the vehicle 1 it issues a signal to the central control unit 31 which analyzes and judges the signal, then activates the side fog lamp drive unit 32 based on the turning direction of the vehicle 1 to activate the left side fog lamp unit 13 or the right side fog lamp unit 23 corresponding to the turning direction.

In addition, the vehicle fog lamp set further includes a switch module 50 which is electrically connected to the central control unit 31 to control the left main fog lamp unit 12, the right main fog lamp unit 22 and the rear fog lamp module 40. Through the switch module 50 the left main fog lamp unit 12 and the right main fog lamp unit 22 at the front side of the vehicle 1, or the rear fog lamp module 40 at the rear side of the vehicle 1 can be selectively activated as desired; or the left main fog lamp unit 12, the right main fog lamp unit 22 at and the rear fog lamp module 40 also can be activated at the same time. It is to be noted that the left side fog lamp unit 13 and the right side fog lamp unit 23 are activated through the detected turning direction of the vehicle 1 rather than through the switch module 50. But when the switch module 50 activates the left main fog lamp unit 12, the right main fog lamp unit 22 and the rear fog lamp module 40 at the same time the central control unit 31 judges that the vehicle 1 is driving in an environment of a poor visual environment, and the left side fog lamp unit 13 and the right side fog lamp unit 23 also are activated at the same time.

Please refer to FIGS. 3 through 6 for further discussion of the invention. In this embodiment the left side fog lamp unit 13 further includes a left side fog lamp base 131 vertically located on a left side edge of the left fog lamp substrate 11 and a left side fog lamp LED 132 located at one side of the left side fog lamp base 131 abutting the ground surface. The right side fog lamp unit 23 further includes a right side fog lamp base 231 vertically located on a right side edge of the right fog lamp substrate 21 and a right side fog lamp LED 232 located at one side of the right side fog lamp base 231 abutting the ground surface. Through the left side fog lamp base 131 and the right side fog lamp base 231 the left side fog lamp LED 132 and the right side fog lamp LED 232 can project light at an angle inclined downward to collaborate with optical elements to allow the driver to get accurate driving information of lateral sides close to the ground surface.

Furthermore, also referring to FIG. 2, the vehicle fog lamp set further includes a light intensity control unit 60 which is electrically connected to the central control unit 31. The left main fog lamp unit 12 further includes a first upper lamp row 121 and a first lower lamp row 122 parallel with the first upper lamp row 121, and the right main fog lamp unit 22 further includes a second upper lamp row 221 and a second lower lamp row 222 parallel with the first upper lamp row 221. The first upper lamp row 121, the first lower lamp row 122, the second upper lamp row 221 and the second lower lamp row 222 consist respectively a plurality of LEDs arranged on straight lines. Through the light intensity control unit 60, the intensity of the left main fog lamp unit 12 and the right main fog lamp unit 22 can be adjusted as desired, and the first upper lamp row 121, the second upper lamp row 221, the first lower lamp row 122 and the second lower lamp row 222 can be selectively activated individually or together at the same time.

Moreover, the central control unit 31 further includes a pulse modulator 311 so that the central control unit 31 can change output fashions of the left fog lamp module 10, the right fog lamp module 20 and the rear fog lamp module 40 to provide more diversified lighting alterations.

As a conclusion, the invention can provide features as follows:

1. Through the left side fog lamp unit and the right side fog lamp unit generation of visual blind spots during turning of the vehicle can be avoided to prevent accidents from taking place.

2. Through the turning detection unit the central control unit can activate the side fog lamp drive unit according to the turning direction of the vehicle, and consequentially activate the left side fog lamp unit or the right side fog lamp unit corresponding to the turning direction of the vehicle.

3. Through the left side fog lamp base and the right side fog lamp base the left side fog lamp LED and the right side fog lamp LED located thereon can project light to the ground surface to allow the driver to get more accurate driving information of the lateral sides close to the ground surface.

4. Through the light intensity control unit the intensity of the left main fog lamp unit and the right main fog lamp unit can be adjusted as desired; and in a poor visual condition the light projection distance of the left main fog lamp unit and the right main fog lamp unit can be increased to improve driver's visibility.

What is claimed is:

1. A vehicle fog lamp set used on a vehicle, comprising:
a left fog lamp module which is located on the left front side of the vehicle and includes a left fog lamp substrate, a left main fog lamp unit located on the left fog lamp substrate and a left side fog lamp unit located on a left side edge of the left fog lamp substrate opposing the left main fog lamp unit, the left side fog lamp unit including a left side fog lamp base vertically located on the left side edge of the left fog lamp substrate and a left side fog lamp LED located at one side of the left side fog lamp base abutting a wound surface;
a right fog lamp module which is located on the right front side of the vehicle and includes a right fog lamp substrate, a right main fog lamp unit located on the right fog lamp substrate and a right side fog lamp unit located on a right side edge of the right fog lamp substrate opposing the right main fog lamp unit, the right side fog lamp unit further includes a right side fog lamp base vertically located on the right side edge of the right fog lamp substrate and a right side fog lamp LED located at one side of the right side fog lamp base abutting a ground surface; and
a control drive module including a central control unit, a side fog lamp drive unit and a turning detection unit electrically connected to the central control unit to control activation of the left side fog lamp unit and the right side fog lamp unit; the side fog lamp drive unit being electrically connected to the central control unit, the left side fog lamp unit and the right side fog lamp unit;
wherein the turning detection unit detects turning of the vehicle to order the central control unit to activate the side fog lamp drive unit to activate the left side fog lamp unit and the right side fog lamp unit according to the turning of the vehicle.

2. The vehicle fog lamp set of claim 1 further including a rear fog lamp module located at the rear side of the vehicle, the control drive module further including a main fog lamp drive unit and a rear fog lamp drive unit, the main fog lamp drive unit being electrically connected to the central control unit, the left main fog lamp unit and the right main fog lamp unit, the rear fog lamp drive unit being electrically connected to the central control unit and the rear fog lamp module.

3. The vehicle fog lamp set of claim 2 further including a switch module electrically connected to the central control unit to control activation of the left main fog lamp unit, the right main fog lamp unit and the rear fog lamp module.

4. The vehicle fog lamp set of claim 1, wherein the left main fog lamp unit further includes a first upper lamp row and a first lower lamp row parallel with the first upper lamp row, and the right main fog lamp unit further includes a second upper lamp row and a second lower lamp row parallel with the second upper lamp row, the first upper lamp row, the first lower lamp row, the second upper lamp row and the second lower lamp row were respectively comprised of a plurality of LEDs arranged on straight lines.

5. The vehicle fog lamp set of claim 4 further including a light intensity control unit electrically connected to the central control unit.

6. The vehicle fog lamp set of claim 1, wherein the central control unit further includes a pulse modulator.

\* \* \* \* \*